Nov. 1, 1966 J. R. BUCK 3,283,261
MEANS FOR INCREASING EFFECTIVE GAIN OF A MICROWAVE
CAVITY FREQUENCY DISCRIMINATOR
Filed Jan. 30, 1964

WITNESSES:
John G. Chopp
James T. Young

INVENTOR
John R. Buck
BY Ernest P. Klipfel
ATTORNEY 3,283,261
Patented Nov. 1, 1966

3,283,261

MEANS FOR INCREASING EFFECTIVE GAIN OF A MICROWAVE CAVITY FREQUENCY DISCRIMINATOR

John R. Buck, Baltimore, Md., assignor to Westinghouse Electric Corporation, Pittsburgh, Pa., a corporation of Pennsylvania Filed Jan. 30, 1964, Ser. No. 341,343
7 Claims. (Cl. 331—9)

The present invention relates generally to frequency control systems and more particularly to apparatus and method for increasing the effective gain of a microwave cavity to improve stabilization of a microwave generator.

An important consideration in the design of an electronically stabilized microwave oscillator is the performance of the unit in a vibration environment. In general, the electronic portion of the stabilizing loop causes more difficulty during vibration than the microwave portion due to the relative motion of the vacuum tube elements, the movement of components and leads with respect to the chassis, and the motion of components and leads with respect to each other. Of course, rigid chassis construction and fastening of components will minimize the vibration effects but the motion cannot be completely eliminated, particularly in regard to the vacuum tubes. In addition, other disturbances caused by noise sources in the electronic portion of the stabilizing loop and by ripple and noise voltages on the power supplies used for the electronic portions degrade the short term stability of the stabilized microwave oscillator.

A frequency control system utilizing the phase characteristic of a microwave cavity as the error detection element to stabilize a microwave oscillator has been developed to reduce the effect of random noise vibration input and other disturbances. One such system is as described and claimed in U.S. Patent No. 2,917,713, issued December 15, 1959, entitled, "Frequency Control System," by C. H. Grauling, Jr., and assigned to the present assignee. Such a system is responsive to the phase of the output signal from a cavity to measure frequency deviation of a microwave generator from a desired frequency and limits the amplitude of the output signal from the cavity to reduce amplitude disturbances in the feedback loop due to vibration or other causes. However, frequency control systems for microwave oscillators which respond to the phase rather than the amplitude of a microwave cavity will experience phase disturbances caused by vibration inputs to the system.

The present invention is an improvement in frequency control systems of the aforementioned patent where the phase characteristic of the cavity is used as an error reference to determine the extent of frequency deviation of the microwave frequency generator. The present invention provides apparatus and method for increasing the effective gain of the microwave portion of the feedback loop to reduce the effect of vibrational disturbances and other disturbances in the electronic portion of the feedback loop. A disturbance introduced at a point in a feedback loop will be reduced in magnitude by a gain increase at a point between the element being stabilized and the point prior to where the disturbance is introduced. The present invention provides such a gain increase by increasing the effective gain of the microwave cavity; that is, the degrees of phase shift for a given number of cycles per second change in signal frequency.

Accordingly, an object of the present invention is to provide apparatus and method for increasing the effective gain of a microwave cavity.

Another object of the present invention is to increase the discernibility of a microwave frequency discriminator.

Another object of the present invention is to provide apparatus and method for increasing the gain in the microwave portion of a feedback loop for a frequency control system where the phase characteristic of the microwave cavity is used as a reference.

Another object of the present invention is to provide apparatus and method for increasing the degrees of phase shift in the output of the cavity for a predetermined number of cycles per second variance in microwave oscillator frequency output over the phase shift occurring in a conventional system.

Another object of the present invention is to provide a frequency control system having increased phase gain in the microwave portion of the feedback loop so that any disturbance in the following electronic portion of the feedback loop will be relatively diminished.

Another object of the present invention is to provide apparatus and method to increase the amount of phase shift in the output of a microwave oscillator for a given change in signal frequency from its center frequency.

Another object of the present invention is to provide a frequency control system for a microwave frequency generator wherein the amplitude of the sidebands of the output signal are significantly reduced over conventional frequency control systems.

Briefly, the present invention accomplishes the foregoing objects and advantages by bypassing a part of the input to the microwave cavity when the input to the cavity is at the center or resonant frequency of the cavity. The bypass part of the input to the cavity is shifted 180° and reinjected or added to the output of the cavity to increase the amount of phase shift of the output signal from the cavity for a given change in the signal frequency from the center frequency.

Further objects and advantages of the present invention will be readily apparent from the following detailed description taken in conjunction with the drawing, in which.

Figure 1:
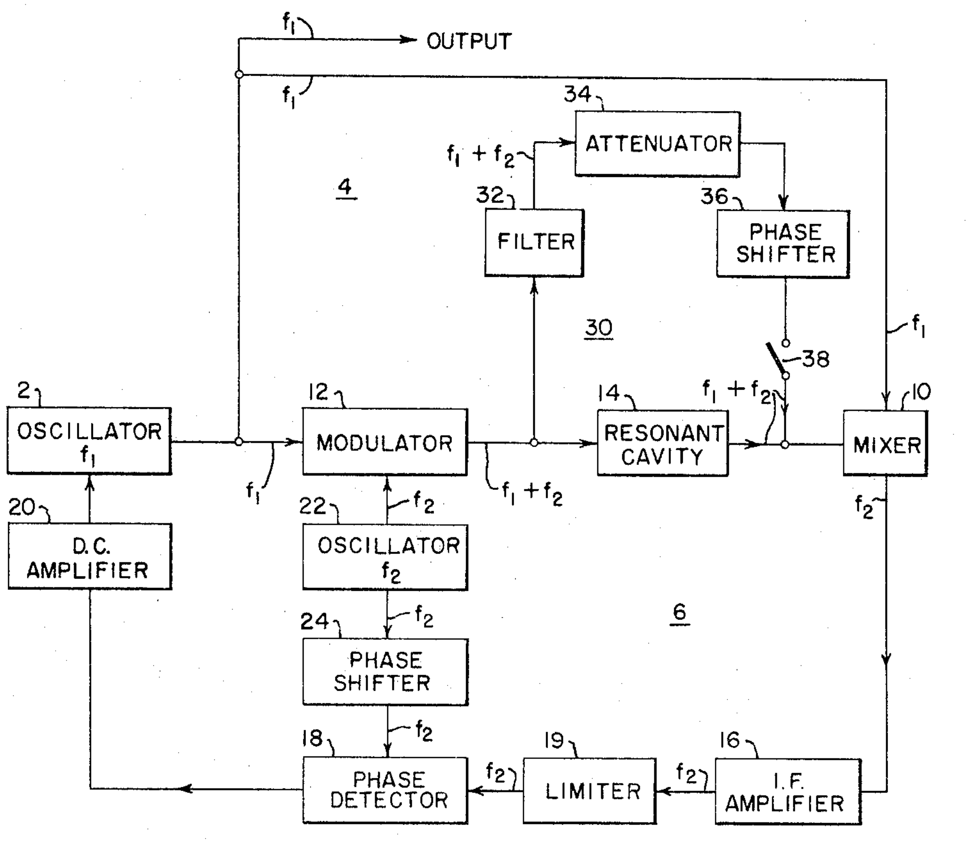
FIGURE 1 is a block diagram of a system incorporating an illustrative embodiment of the present invention.

FIGURE 1 illustrates a frequency control system for a microwave frequency generator such as an oscillator 2. The oscillator 2, which may be for example a klystron in the X-band, provides microwave energy at a desired frequency $f_1$ through suitable means such as a wave guide transmission line to a load or utilization device, not shown. Two other parts of the output from the microwave oscillator 2 are combined to actuate a microwave loop 4. An electronic feedback loop 6 senses the interaction of the two outputs in the microwave loop 4 to provide a control signal to the microwave oscillator 2 when the frequency of the output from the oscillator 2 has varied from the desired frequency.

The general operation of the system is as described and claimed in the aforementioned patent. Suffice for these purposes, a portion of the output from the microwave oscillator 2 is combined with an intermediate frequency, of say 30 megacycles, in the mixer 10 with a selected sideband frequency $f_1+f_2$ produced by a modulator 12. The modulator 12 provides sidebands of the desired or carrier frequency $f_1$; namely, $f_1+f_2$ and $f_1-f_2$. A resonant cavity 14 is tuned to a center frequency of one of the sidebands, herein illustrated as $f_1+f_2$, and produces phase shift on this sideband in response to frequency changes from the desired frequency $f_1$ in the microwave oscillator 2. The mixer 10 receives the carrier signal at frequency $f_1$ from a straight through channel and one sideband via the cavity 14. Thus, it functions as a true mixer and the beat frequency $f_2$ is produced at the output of the mixer 10 with a phase determined by the relation between sideband frequency and oscillator frequency. The frequency deviation or error information is contained in the phase of the IF signal, $f_2$, rather than in its amplitude.

The electronic loop 6 amplifies the IF signal at frequency $f_2$ with the IF amplifier 16 and provides a constant amplitude signal to a phase detector 18 through a limiter 19. The constant amplitude signal of variable phase is compared with a signal of reference frequency $f_2$ from the IF oscillator 22. Since there may be some phase shift in the IF amplifier 16 and the phase angle, although fixed, may not be zero. A phase shifter 24 is inserted in the reference signal channel between the oscillator 22 and phase detector 18. The phase detector 18 compares the constant amplitude signal of variable phase from the limiter 19 with a reference signal of frequency $f_2$ to provide the necessary control voltage which is amplified by the amplifier 20 to control the frequency output of the oscillator 2. Accordingly, the microwave oscillator 2 responds to a signal which is a function of the phase shift of the sideband signal $f_1+f_2$. The phase of the output signal from the resonant cavity 14 is a function of the deviation of frequency of the microwave oscillator 2 from the desired frequency output $f_1$.

Figure 2:
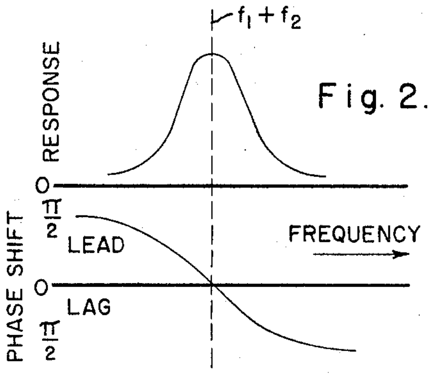
FIG. 2 is a graphical representation of transmission characteristics of a resonant cavity utilized in the illustrative embodiment of FIG. 1.

It can be seen from FIG. 2 that as the frequency of the output from the microwave oscillator 2 shifts from the desired value $f_1$ to a new value $f_1+\Delta f$, there will be a phase shift in the sideband energy which is now of frequency $f_1+f_2+\Delta f$. The phase shift will either be leading or lagging depending upon whether the new frequency from the oscillator 2 is greater or less than the desired frequency $f_1$.

The present invention increases the phase shift in the output of the cavity 14 for a given change in signal frequency in comparison to the system described in the aforementioned patent. By increasing the effective gain of the cavity 14, which is located between the oscillator 2 and any vibrations introduced into the electron circuit 6, the effect of such disturbance on the system can be greatly reduced.

Figure 3:
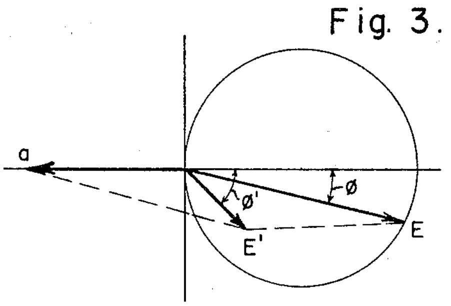
FIG. 3 is a vector diagram useful in understanding the operation of the present invention.

FIG. 3 illustrates how the present invention increases the effective gain of the cavity 14 for a given change in signal frequency from the desired frequency $f_1$. When the output signal from the oscillator 2 is of the desired frequency $f_1$, the output E from the cavity 14 can be represented to be located on the X axis of FIG. 3 with no resulting phase shift. Should the frequency of the input signal to the cavity 14 change, however, from the sideband signal of frequency $f_1+f_2$ to which it is tuned, such as for example to $f_1+f_2+\Delta f$, then the output signal E from the cavity will be shifted by a phase angle $\phi$. The extent of the phase shift can be determined by the characteristic curve of FIG. 2.

To increase the amount of phase shift for a given deviation of signal frequency a part of the input signal to the cavity 14 is passed by the cavity, shifted 180° out of phase with the center frequency output signal of the cavity and reinjected with the output signal of the cavity.

More particularly, the normalized output from the cavity 14 can be described by the equation:

$$E=\sqrt{\frac{1}{1+j2Q\sigma}}$$

for a relatively small $\delta$ where $$\delta=\frac{\omega-\omega_0}{\omega_0}$$

which is the signal frequency change with respect to the center frequency of the cavity and Q is the figure of merit of the cavity. This expression plots into a circle as shown in FIG. 3. For a given $\delta$, the angle $\phi$ is equal to $$\phi=\tan^{-1}2Q$$

It can be seen from FIG. 3 that the addition of a vector, $a$, will result in a phase angle $\phi'$ greater than $\phi$ where $$\phi'\cong\tan^{-1}\frac{2Q\delta}{1-a}$$

for small values of the factor $Q\delta$. This has the effect of increasing the phase gain or "effective Q" by a factor of $1/1-a$.

To so increase the effective gain of the reference cavity 12, the bypass loop 30 is provided as shown in FIG. 1. The bypass loop 30 bypasses a portion of the normalize signal of frequency $f_1+f_2$ going into the cavity when the microwave oscillator 2 is operating at the desired frequency $f_1$. When desired, a filter 32 may be utilized to block the sideband signal which is not selected, such as $f_1-f_2$ when $f_1+f_2$ is the center frequency, from passing around the cavity and being reinjected on the other side of the cavity to degrade the desired signal output from the cavity. The filter allows passage of the signal of frequency $f_1+f_2$. An attenuator 34 sets the magnitude of the signal, or vector $a$, to a nominal value before reinsertion into the output of the resonant cavity 14. A phase shifter 36 is used to adjust the nominal value of the bypass signal or vector, $a$, to the correct 180° relationship. The bypass loop 30 is terminated around the cavity 14 by means of directional couplers which allow energy flow only in the forward direction in the microwave guides.

A difficulty occurs when initially closing the bypass loop 30. Before the loop 30 is closed, the microwave oscillator signal is not likely to be at the desired frequency $f_1$ and accordingly the sideband signal will not be at the center or resonant frequency of the cavity 14. The largest output signal could then be very well through the alternate path provided by the bypass loop 30 around the cavity. This signal may have erroneous phase information due to the characteristics of the alternate path and will result in a false lockup of the system. This difficulty is eliminated by providing a switch 38 in the bypass loop 30 which will not allow the signal to pass through the loop 30 until the loop has been closed in the normal manner with the bypass loop effectively disconnected. The gain increase experienced with the present invention was approximately 15 db. The maximum increase in gain that can be achieved is limited by the gain margin of the stabilizing loop and the signal amplitude required for proper limiting action. The unit was vibrated with a random noise vibration input into the electronic feedback circuit 6 and frequency spectrum of the stabilized signal resulting from the vibration was measured. It was noted that the sideband amplitude was reduced by use of the gain increase when compared with similar units which did not have the increased gain. It was determined that the reduction in sideband amplitude (improved short term stability) was accomplished not by increase in the overall gain, but rather by increasing the gain ahead of the electronic feedback loop (as expected) by vibrating the electronic and microwave portions of the unit separately. It was found that the amplitude of the sideband signals were reduced approximately 12 db by the addition of the bypass loop 30. The vibration of the electronic feedback circuit with the bypass loop 30 connected resulted in the amplitude of the sidebands on the output signal being reduced by 12 db. The difference in increase of the gain of the cavity to 15 db while only receiving an improvement of 12 db reduction on the amplitude of the sidebands is considered insignificant. Apparently circuit degradation was experienced to the extent of 3 db.

While the present invention has been described with a degree of particularity for the purposes of illustration, it is to be understood that all alterations, modifications and equivalents within the spirit and scope of the present invention are herein meant to be included. For example, while the present invention has been illustrated in a frequency control system for a microwave oscillator, the cavity 14 and the bypass loop 30 combine to make an excellent microwave frequency discriminator where the effective gain of the cavity is increased from, for example, $\phi$ to $\phi'$ as shown in FIG. 3, for a given number of cycles per second deviation from the center frequency of the cavity.

I claim as my invention:

1. In combination, a reference cavity providing phase information on the variance of input to the cavity from a predetermined frequency; means for bypassing a portion of said input signal around said cavity when at said predetermined frequency; and means for reinjecting the bypassed portion 180° out of phase with the cavity output signal to increase the magnitude of said phase information.

2. In combination, a cavity having a resonant frequency and providing an output signal shifted in hase from the resonant frequency output of the cavity when a transient frequency in the input to said cavity occurs; means for bypassing the cavity with a portion of the input signal at the resonant frequency; means for shifting said bypassed portion 180 electrical degrees; and means for adding the bypassed portion to the output of said cavity to increase the effective gain of said cavity.

3. In a microwave oscillator frequency control system responsive to phase information to stabilize the desired output frequency from the microwave oscillator; means for passing a predetermined sideband of said desired frequency and shifting the phase of said sideband in response to frequency changes from said desired frequency and means for bypassing a portion of said predetermined sideband of the microwave oscillator signal of said desired frequency and reinjecting said portion, shifted 180°, with the shifted sideband signal to increase the magnitude of the phase information for a given frequency change.

4. In a microwave oscillator frequency control system; oscillator means for providing a desired frequency; means for modulating said desired frequency; cavity means responsive to an input signal of a predetermined sideband of the modulated frequency for producing phase shift of said sideband in response to frequency changes in the microwave oscillator; a bypass loop around said cavity for adding to the output of said cavity a portion of the input signal to said cavity when of said predetermined sideband frequency; filter means for blocking passage of other sidebands of the modulated frequency through the bypass loop; directional coupler means at the input and output of said cavity means to allow unidirectional energy flow around said cavity means; and means responsive to the increased shift in phase of said sideband frequency signal to tune said microwave oscillator means to said desired frequency.

5. The apparatus of claim 4 wherein said bypass loop includes phase shifter means for shifting 180 electrical degrees the phase of said portion of the input signal to said cavity when of the desired frequency before being added to the output from said cavity.

6. The apparatus of claim 9 where said bypass loop includes attenuator means to set the magnitude of the bypassed portion of the input signal prior to being added to the output of said cavity.

7. The apparatus of claim 4 wherein said bypass loop includes switching means for connecting said bypass loop across said cavity means only after energization of the microwave oscillator frequency control system.

References Cited by the Examiner

UNITED STATES PATENTS

| | | | |
|---|---|---|---|
| 2,476,311 | 7/1949 | Learned | 331—9 |
| 2,917,713 | 12/1959 | Grauling | 331—6 |

ROY LAKE, *Primary Examiner.*

S. H. GRIMM, *Assistant Examiner.*